US012688479B2

(12) United States Patent
Sim et al.

(10) Patent No.: US 12,688,479 B2
(45) Date of Patent: Jul. 21, 2026

(54) ELECTRONIC DATA VERIFICATION ROUTING USING ARTIFICIAL INTELLIGENCE

(71) Applicant: Stripe, LLC, South San Francisco, CA (US)

(72) Inventors: Daniel Sim, Sengkang (SG); Donald Vitas M. Piret, Marine Parade (SG); Shengwei Wu, Singapore (SG)

(73) Assignee: Stripe, LLC

( * ) Notice: Subject to any disclaimer, the term of this patent is extended or adjusted under 35 U.S.C. 154(b) by 83 days.

(21) Appl. No.: 18/145,633

(22) Filed: Dec. 22, 2022

(65) Prior Publication Data

US 2024/0211845 A1     Jun. 27, 2024

(51) Int. Cl.
*G06Q 10/0639* (2023.01)
*G06N 20/00* (2019.01)

(52) U.S. Cl.
CPC ....... *G06Q 10/06395* (2013.01); *G06N 20/00* (2019.01)

(58) Field of Classification Search
USPC ......................................................... 705/7.41
See application file for complete search history.

(56) References Cited

U.S. PATENT DOCUMENTS 6,310,889 B1 * 10/2001 Parsons ................... H04L 41/00
455/433

6,510,461 B1 * 1/2003 Nielsen ................... H04L 12/18
709/224
8,775,332 B1 * 7/2014 Morris ..................... G06N 5/02
706/11

(Continued)

FOREIGN PATENT DOCUMENTS

CN        111527499 A  *  8/2020  .............. G06N 3/08
CN        113240430 A      8/2021

(Continued)

OTHER PUBLICATIONS

Amin, Rashid, et al. "A survey on machine learning techniques for routing optimization in SDN." IEEE Access 9 (2021): 104582-104611. (Year: 2021).*

(Continued)

*Primary Examiner* — Kristin E Gavin
(74) *Attorney, Agent, or Firm* — Foley & Lardner LLP

(57)            ABSTRACT

Disclosed herein are systems and methods for identifying and transmitting electronic requests to a suitable service provider. In one method, a server receives, from a computing device, a request to verify data via at least one service provider; executes a first computer model to identify a likelihood of verification success of the data; responsive to the likelihood of verification success satisfying a threshold, executes a second computer model to determine a service provider to transmit the request based on a first attribute associated with the data, a type of verification associated with the request, and a second attribute associated with the set of service providers and an impact value associated with each service provider; and responsive to determining the service provider from the set of service providers, transmitting, by the processor via an application programming interface, the data to the service provider.

19 Claims, 4 Drawing Sheets

200

Receive, from a computing device, a request to verify data via at least one service provider of a set of service providers. 210

Execute a first computer model to identify a likelihood of verification success of the data. 220

Responsive to the likelihood of verification success satisfying a threshold, executing a second computer model to determine a service provider from the set of service providers to transmit the request based on a first attribute associated with the data, a type of verification associated with the request, a second attribute associated with the set of service providers, and an impact value associated with each service provider. 230

Responsive to determining the service provider from the set of service providers, transmitting, by the processor via an application programming interface, the data to the service provider. 240

(56) References Cited

U.S. PATENT DOCUMENTS

| | | | | |
|---|---|---|---|---|
| 10,116,524 | B2* | 10/2018 | Jensen | H04L 47/25 |
| 11,250,429 | B1 | 2/2022 | Ravi et al. | |
| 2003/0043397 | A1* | 3/2003 | Kaltenecker | G06F 3/1244 |
| | | | | 358/1.13 |
| 2003/0050795 | A1* | 3/2003 | Baldwin, Jr. | G06Q 40/02 |
| | | | | 705/2 |
| 2012/0054642 | A1* | 3/2012 | Balsiger | G06Q 10/10 |
| | | | | 715/752 |
| 2013/0018651 | A1* | 1/2013 | Djordjevic | G06Q 10/00 |
| | | | | 704/9 |
| 2015/0149609 | A1* | 5/2015 | Zou | H04L 41/065 |
| | | | | 709/224 |
| 2017/0147941 | A1* | 5/2017 | Bauer | G06N 20/10 |
| 2018/0302308 | A1* | 10/2018 | O'Brien | H04L 43/10 |
| 2019/0101403 | A1* | 4/2019 | Blandin | G08G 1/096888 |
| 2019/0384971 | A1* | 12/2019 | Borodin | G06V 30/412 |
| 2020/0358662 | A1* | 11/2020 | Kundu | G06N 7/01 |
| 2020/0366671 | A1* | 11/2020 | Larson | H04L 9/3231 |
| 2020/0380627 | A1* | 12/2020 | Jarvis | G06Q 50/265 |
| 2021/0049259 | A1 | 2/2021 | Cheng et al. | |
| 2021/0056599 | A1* | 2/2021 | Adibi | G06N 3/088 |
| 2022/0121842 | A1* | 4/2022 | Goel | G06F 16/285 |
| 2022/0318315 | A1* | 10/2022 | Wyle | G06V 30/1448 |
| 2022/0345522 | A1* | 10/2022 | Kolar | G06F 9/5077 |
| 2022/0392350 | A1* | 12/2022 | Lala | G06Q 10/0631 |
| 2022/0400161 | A1* | 12/2022 | Zafiris | H04L 61/5007 |
| 2023/0342658 | A1* | 10/2023 | Tripathi | G06F 9/5072 |

FOREIGN PATENT DOCUMENTS

| | | |
|---|---|---|
| CN | 113850325 A | 12/2021 |
| EP | 3 550 458 A1 | 10/2019 |

OTHER PUBLICATIONS

Thalange, A. V., et al. "Online Document Identification and Verification Using Machine Learning Model." International Conference on Data, Engineering and Applications. Singapore: Springer Nature Singapore, 2022. (Year: 2022).*

Uhlir, Vojtech, Ondrej Tomanek, and Lukas Kencl. "Latency-based benchmarking of cloud service providers." Proceedings of the 9th IEEE/ACM International Conference on Utility and Cloud Computing. 2016. (Year: 2016).*

Akinade, Afees Olanrewaju, et al. "Advancing segment routing technology: A new model for scalable and low-latency IP/MPLS backbone optimization." Open Access Research Journal of Science and Technology 5.2 (2022): 77-95. (Year: 2022).*

International Search Report and Written Opinion on PCT Matter PCT/US2023/085626 dated Mar. 26, 2024 (13 pages).

* cited by examiner

100

Figure 2:
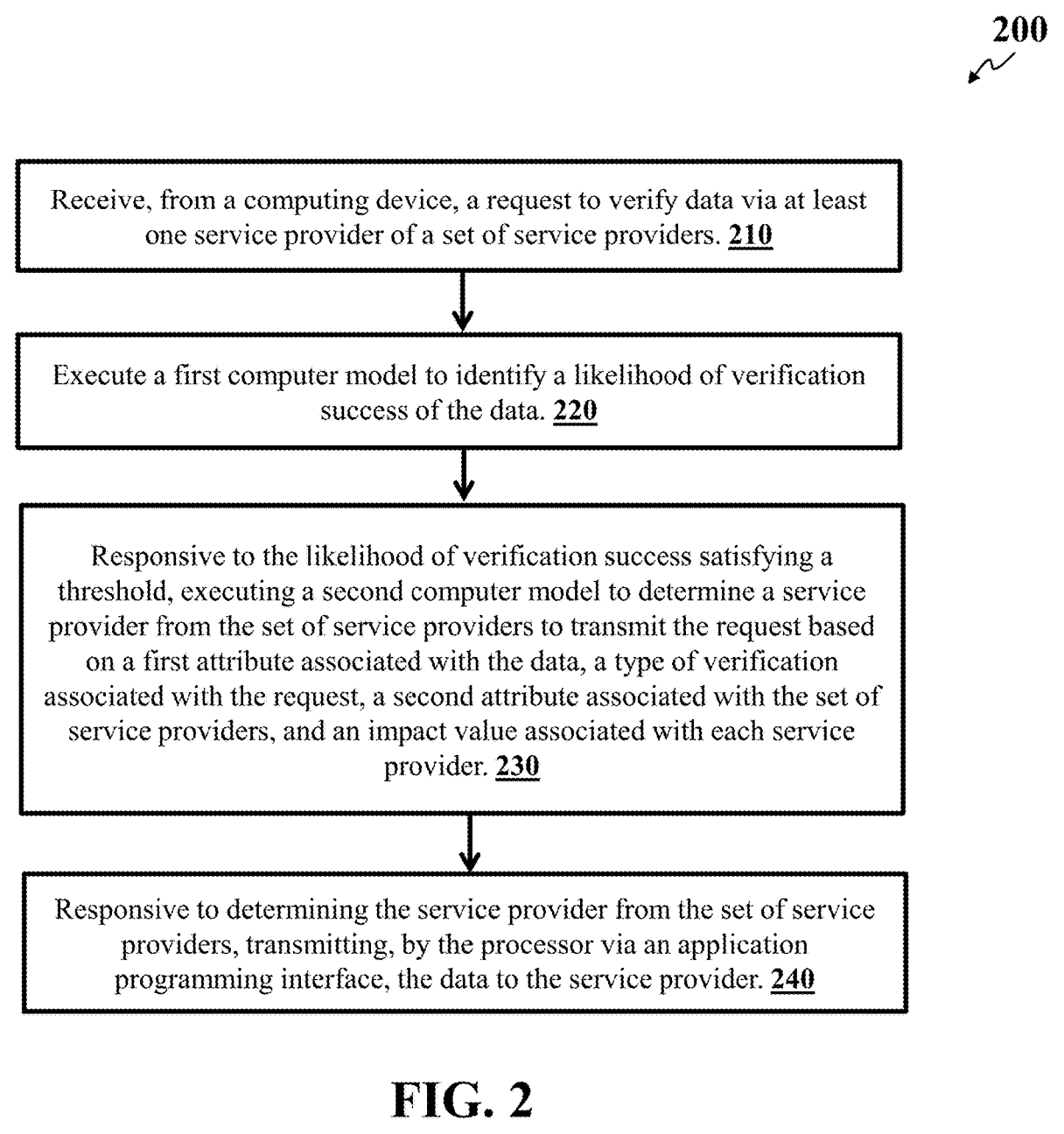

200

Receive, from a computing device, a request to verify data via at least one service provider of a set of service providers. 210

↓

Execute a first computer model to identify a likelihood of verification success of the data. 220

↓

Responsive to the likelihood of verification success satisfying a threshold, executing a second computer model to determine a service provider from the set of service providers to transmit the request based on a first attribute associated with the data, a type of verification associated with the request, a second attribute associated with the set of service providers, and an impact value associated with each service provider. 230

↓

Responsive to determining the service provider from the set of service providers, transmitting, by the processor via an application programming interface, the data to the service provider. 240

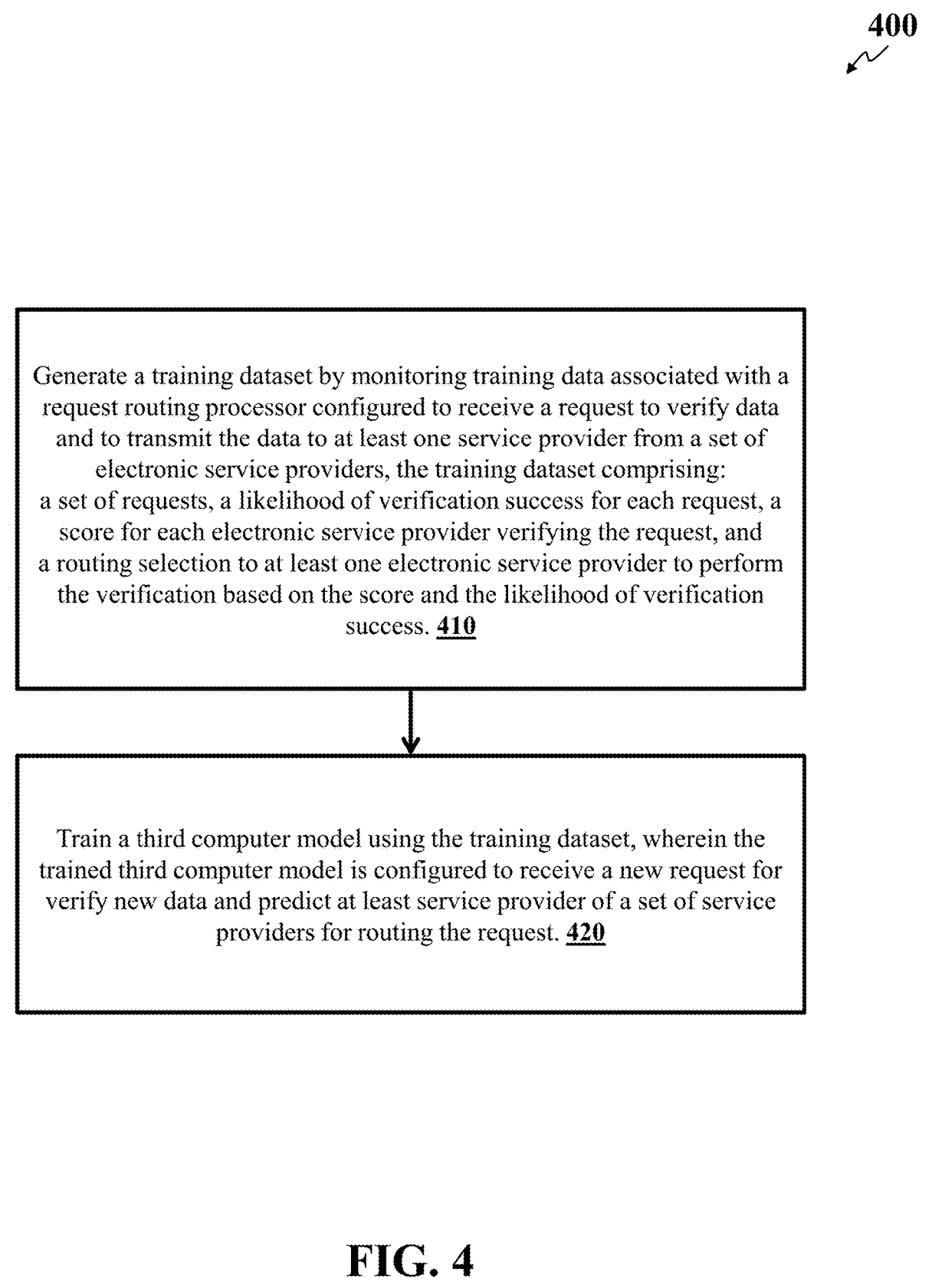

Generate a training dataset by monitoring training data associated with a request routing processor configured to receive a request to verify data and to transmit the data to at least one service provider from a set of electronic service providers, the training dataset comprising:
a set of requests, a likelihood of verification success for each request, a score for each electronic service provider verifying the request, and
a routing selection to at least one electronic service provider to perform the verification based on the score and the likelihood of verification success. 410

Train a third computer model using the training dataset, wherein the trained third computer model is configured to receive a new request for verify new data and predict at least service provider of a set of service providers for routing the request. 420

FIG. 4

ELECTRONIC DATA VERIFICATION ROUTING USING ARTIFICIAL INTELLIGENCE

TECHNICAL FIELD

This application relates generally to generating, training, and operating computer models to analyze and detect a suitable service provider to analyze and verify data.

BACKGROUND

Electronic content verification may be necessary before an electronic process is executed. For instance, electronic verification of one or more documents (e.g., identification or credit-related documents) may be necessary before a financial transaction is conducted or funds are transferred. In another example, verification may be needed to establish "trust" between two computing infrastructures before they can communicate and transfer data needed to execute one or more protocols. For instance, in some financial ecosystems, trust may be established by verifying data provided by an end-user (e.g., user identity, business entity, email, phone, address, bank number, and income statements) before transferring funds to a merchant or before creation of certain electronic documents. Moreover, verifying data provided (e.g., uploaded) by users may be needed to combat fraud, enable know-your-customer (KYC) or know-your-business (KYB) processes, and/or allow users (and their devices) to participate in a trusted marketplace.

To create efficiencies, some platforms receive data from an end-user and outsource the verification to different service providers (internal and/or third-party servers that can verify the data), which in turn charge the platform for their services. However, the conventional allocation to service providers from these platforms suffers from technical challenges. For instance, as these platforms scale, the platforms may receive a large volume of content to outsource to different service providers. Identifying the suitable/appropriate service providers is a difficult process that may consider multiple variables (e.g., characteristics of the end-user, characteristics of the service provider, or cost associated with each verification), which may require substantial computing power and may lead to undue verification delays. Conventional first-in-first-out approaches have proven to be ineffective, and funnel approaches have proven to be time-consuming and require substantial computing power. Accordingly, these approaches are highly undesirable, especially for time-sensitive requests.

SUMMARY

For the aforementioned reasons, there is a desire for methods and systems to provide a rapid and efficient analysis of pertinent characteristics of a request in order to identify a suitable service provider (among a series of service providers) to verify data provided by an end-user. What is also desired is efficient routing of data to be verified to one or more suitable service providers, such as a platform that can receive to be verified, identify the suitable service provider, route the request to the service provider, and display or otherwise output the results.

Disclosed herein are methods and systems associated with an intelligent data verification platform that uses various methods, such as algorithmic methods and machine-learning models, to identify a suitable service provider to verify electronic content (e.g., data uploaded by an end-user). Also disclosed herein are methods and systems to monitor data generated by the intelligent data verification platform to train one or more machine-learning models to predict an outcome of the platform itself. The disclosed machine learning model may, after being properly trained, ingest data to be verified and predict a suitable service provider. In essence, the machine-learning model may be executed in conjunction with or instead of the platform.

In an embodiment, a method comprises receiving, by a processor from a computing device, a request to verify data via at least one service provider of a set of service providers; executing, by the processor, a first computer model to identify a likelihood of verification success of the data; responsive to the likelihood of verification success satisfying a threshold, executing, by the processor, a second computer model to determine a service provider from the set of service providers to transmit the request to, based on a first attribute associated with the data, a type of verification associated with the request, a second attribute associated with the set of service providers, and an impact value associated with each service provider; and responsive to determining the service provider from the set of service providers, transmitting, by the processor via an application programming interface, the data to the service provider.

The first computer model may determine the likelihood of verification success of the data using at least one of: an attribute of a user operating the computing device, the first attribute associated with the data, a timestamp associated with the request, historical verification data associated with the user, historical verification data associated with at least one service provider, or the type of verification associated with the request.

The method may further comprise executing, by the processor, an optical character recognition protocol to identify the first attribute.

The second computer model may be an artificial intelligence model trained to identify a score for each service provider using historical verification data and to identify the service provider to transmit the request to.

The second attribute associated with each service provider comprises a latency value for each service provider.

The second computer model further uses data associated with a previous request transmitted to one or more service providers.

The impact value corresponds to a cost associated with verification of the request by each service provider.

In another embodiment, a method comprises generating, by a processor, a training dataset by monitoring training data associated with a request routing processor configured to receive a request to verify data and to transmit the data to at least one service provider from a set of service providers, the training dataset comprising: a set of requests received by the request routing processor, each request comprising data to be verified; a likelihood of verification success for each request within the training dataset, the likelihood of verification generated based on the request routing processor executing a first computer model; a score generated based on the request routing processor executing a second computer model that is configured to use a first attribute associated with the data to be verified, a type of verification associated with each request, a second attribute associated with each service provider, and an impact value associated with each service provider to generate the score; and a routing selection, by the request routing processor, to at least one service provider to perform the verification based on the score and the likelihood of verification success; and training, by the processor, a third computer model using the training dataset, wherein the trained third computer model is configured to receive a new request to verify new data and predict at least one service provider of the plurality of service providers for routing the request.

The second attribute associated with each service provider may comprise a latency value for each service provider.

The processor and the request routing processor may belong to the same organization.

The trained third computer model may be further configured to predict a likelihood of verification success for the new request.

The trained third computer model is further configured to predict a score associated with at least one service provider verifying the new data.

The impact value may correspond to a cost associated with verification of the request by each service provider.

In another embodiment, a system comprises a non-transitory computer-readable medium having a set of instructions that when executed by a processor, cause the processor to: receive, from a computing device, a request to verify data via at least one service provider of a set of service providers; execute, a first computer model to identify a likelihood of verification success of the data; responsive to the likelihood of verification success satisfying a threshold, execute a second computer model to determine a service provider from the set of service providers to transmit the request based on a first attribute associated with the data, a type of verification associated with the request, a second attribute associated with the set of service providers, and an impact value associated with each service provider; and responsive to determining the service provider from the set of service providers, transmit, via an application programming interface, the data to the service provider.

The first computer model may determine the likelihood of verification success of the data using at least one of an attribute of a user operating the computing device, the first attribute associated with the data, a timestamp associated with the request, historical verification data associated with the user, historical verification data associated with at least one service provider, or the type of verification associated with the request.

The instructions may further cause the processor to execute an optical character recognition protocol to identify the first attribute.

The second computer model may be an artificial intelligence model trained to identify a score for each service provider using historical verification data and to identify the service provider to transmit the request to.

The second attribute associated with each service provider may comprise a latency value for each service provider.

The second computer model may further use data associated with a previous request transmitted to one or more service providers.

The impact value may correspond to a cost associated with verification of the request by each service provider.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 2 illustrates a flow diagram of a process executed in an intelligent data verification platform, according to an embodiment.

FIG. 4 illustrates a flow diagram of a process executed in an intelligent data verification platform, according to an embodiment.

DETAILED DESCRIPTION

Figure 1:
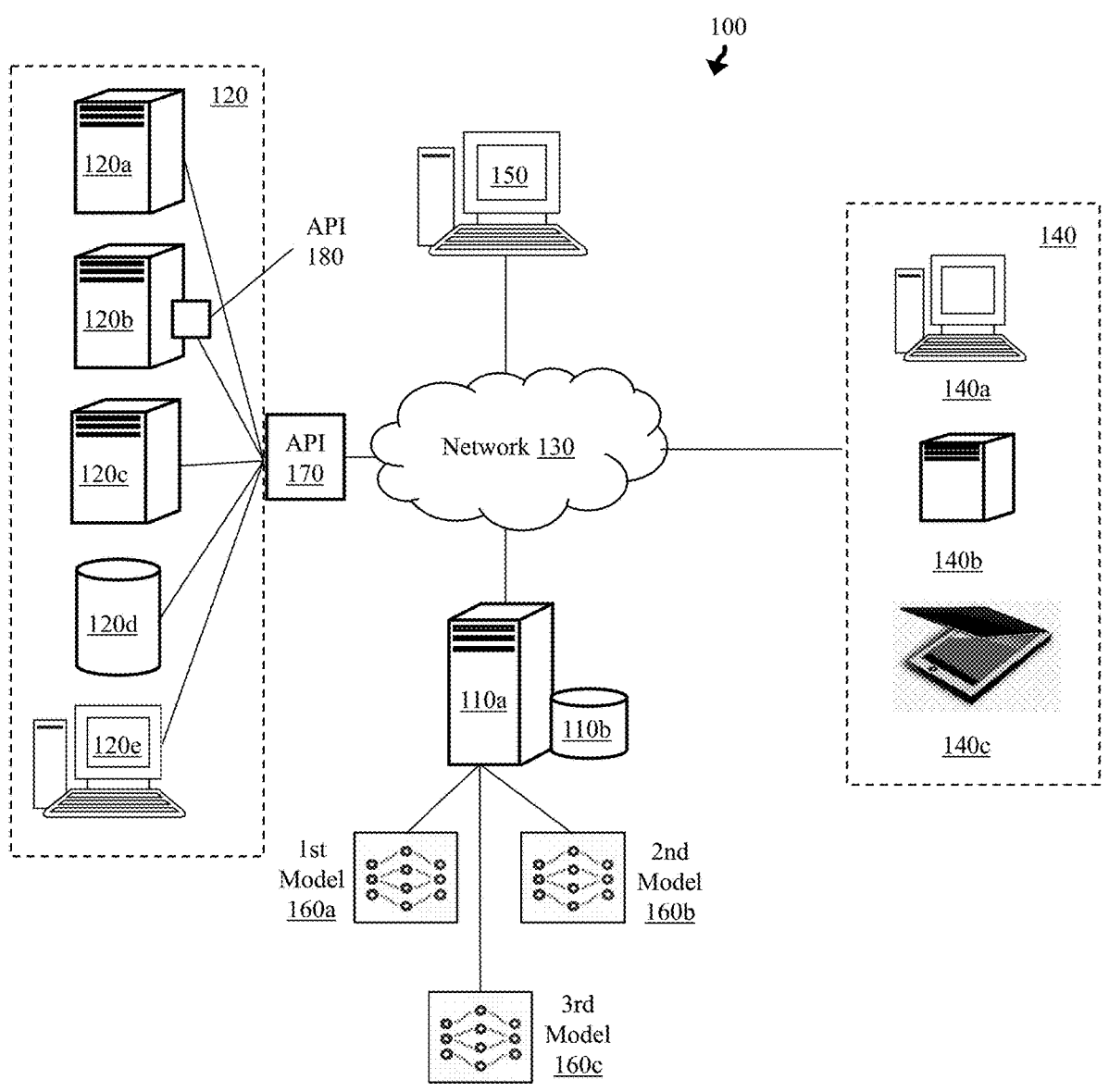
FIG. 1 illustrates various components of an intelligent data verification platform, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein—and additional applications of the principles of the subject matter illustrated herein—that would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

As will be described below, a server (referred to herein as the analytics server) can provide a platform and retrieve (via the platform) data to be verified. The analytics server can then analyze data using various methods described herein to identify a suitable service provider (whether internal or third-party), transmit the data to the identified service provider, and output the results.

FIG. 1 is a non-limiting example of components of an intelligent data verification system 100 in which an analytics server 110a operates. The analytics server 110a may utilize features described in FIG. 1 to retrieve data and generate/display results. e.g., via a platform displayed on various devices. The analytics server 110a may be communicatively coupled to a system database 110b, service providers 120a-e (collectively service providers 120), end-user devices 140a-c (collectively end-user devices 140), and an administrator computing device 150. The analytics server 110a may also use various computer models (e.g., computer models 160a-c) to analyze the data.

The system 100 is not confined to the components described herein and may include additional or other components not shown for brevity, which are to be considered within the scope of the embodiments described herein.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110*a* may generate and display an electronic platform (e.g., intelligent data verification platform that is sometimes referred to as a platform) configured to receive requests to verify data and output the results. The electronic platform may include one or more graphical user interfaces (GUIs) displayed on the end-user device 140 and/or the administrator computing device 150. An example of the platform generated and hosted by the analytics server 110*a* may be a web-based application or a website configured to be displayed on various electronic devices, such as mobile devices, tablets, personal computers, and the like. The platform may include various input elements configured to receive a request and data to be verified. For instance, an end-user may access the platform to upload a file or a document to be verified.

The analytics server 110*a* may be any computing device comprising a processor and non-transitory, machine-readable storage capable of executing the various tasks and processes described herein. The analytics server 110*a* may employ various processors such as a central processing unit (CPU) and graphics processing unit (GPU), among others. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The analytics server 110*a* may utilize one or more application programming interfaces (APIs) to communicate with one or more of the electronic devices described herein. For instance, the analytics server may utilize APIs to automatically transmit/receive data to/from the service providers 120. In some embodiments, the analytics server 110*a* may be in communication with an API 170 that is in turn in communication with different service providers 120. For instance, each service provider may communicate pertinent information to the API 170, which may be hosted by the analytics server 110*a* and configured to then transmit the data to the analytics server 110*a*. In some embodiments, one or more of the service providers may include their own APIs. For instance, the service provider 120*b* may host its own API 180 that may be in direct communication with the analytics server 110*a* or in indirect communication with the analytics server 110*a* (e.g., via the API 170).

The service providers 120 may represent various electronic devices that receive, retrieve, and/or access data to be verified and additional data that may be utilized for verification. Service providers 120, as used herein, may represent an electronic device associated with an entity that verifies the data, such as servers (e.g., 120*a-c*), a database (e.g., 120*d*), or a computer (e.g., 120*e*).

The service providers 120 may verify whether the content of the data can be validated (e.g., in accordance with the verification request). For instance, a service provider may be a server configured to receive data to be verified and execute one or more verification protocols to determine whether the data includes elements that it purports to include. Additionally, service providers 120 may communicate with one or more other databases (not show in FIG. 1) and retrieve additional data used for the verification. For instance, a service provider may query a tax or Social Security database to validate one or more data records.

Each service provider 120 may include one or more computing devices comprising a processor and non-transitory, machine-readable storage capable of executing the various tasks and processes needed to verify the data. For instance, a service provider (e.g., a service provider 120*a*) may execute an optical character recognition to verify one or more attributes of a document uploaded via the platform. The service providers 120 may also comprise other computing components than servers. For instance, a verification specialist may use a computer (e.g., 120*e*) to verify data. In another example, the verification may be made using a database (e.g., 120*d*). However, for ease of description, FIG. 1 refers to all the components depicted as service providers 120.

As described herein, the analytics server 110*a* may use various methods to identify a suitable service provider within the service providers 120 to verify data received from an end-user device 140. For instance, the analytics server 110*a* may receive a first request from a first merchant operating the end-user 140*c* and a second request from a second merchant operating the end-user device 140*a*. The analytics server 110*a* may use various methods discussed herein and execute one or more of the computer models 160 to analyze the requests. The analytics server 110*a* may then determine that the service provider 120*a* is better suited to verify the data received from the second merchant while the service provider 120*c* is better suited to verify the data received from the first merchant.

End-user devices 140 may be any computing device comprising a processor and a non-transitory, machine-readable storage medium capable of performing the various tasks and processes described herein. Non-limiting examples of an end-user device 140 may be a workstation computer, laptop computer, phone, tablet computer, and server computer. During operation, various users may use end-user devices 140 to access the platform operationally managed by the analytics server 110*a*. Even though referred to herein as "end-user" devices, these devices may not always be operated by end-users. For instance, a tablet 140*c* may be used by a merchant (or another person on behalf of a merchant), a loan applicant, a customer, or the like.

The administrator computing device 150 may represent a computing device operated by a system administrator. The administrator computing device 150 may be configured to monitor attributes generated by the analytics server 110*a* (e.g., a suitable service provider or various analytic metrics determined during training of one or more machine learning models and/or systems); monitor one or more computer models 160*a-c* utilized by the analytics server 110*a*, service providers 120, and/or end-user devices 140; review feedback; and/or facilitate training or retraining (calibration) of the computer models 160*a-c* that are maintained by the analytics server 110*a*. In some embodiments, the administrator computing device 150 may display a GUI indicating the request(s) and their corresponding suitable service provider(s) where the administrator computing device 150 can override the results generated by the analytics server 110*a*. For instance, the administrator computing device 150 can manually transmit a particular request to a particular service provider.

The computer models 160*a-c* may be stored in the system database 110*b*. The computer models 160*a-c* may be trained using data received or retrieved from the platform, the service providers 120, and/or other data sources. The analytics server 110*a* may execute one or more of the computer models 160*a-b* to identify a suitable verification of the service providers 120. Additionally, the analytics server 110a may train the computer model 160c using a training dataset generated based on monitoring data associated with the platform.

As described herein, the analytics server 110a may store the computer models 160a-c (e.g., neural networks, random forest, support vector machines, regression models, recurrent models, etc.) in an accessible data repository, such as the system database 110b.

FIG. 2 illustrates a flow diagram of a process executed in an intelligent data verification system, according to an embodiment. The method 200 includes steps 210-240. However, other embodiments may include additional or alternative execution steps, or may omit one or more steps altogether. The method 200 is described as being executed by a server, similar to the analytics server described in FIG. 1. However, one or more steps of method 200 may also be executed by any number of computing devices operating in the distributed computing system described in FIG. 1. For instance, one or more computing devices (e.g., end-user devices) may locally perform part or all of the steps described in FIG. 2. Using the methods and systems described herein, such as the method 200, the analytics server may identify and transmit data to be verified to a particular service provider. In another embodiment the method 200 may be executed by an intelligent API where the intelligent API analyzes data and transmits it to a suitable service provider.

At step 210, the analytics server may receive, from a computing device, a request to verify data via at least one service provider of a set of service providers. The analytics server may display a platform configured to receive various requests and corresponding data to be verified. For instance, an end-user may access the platform (e.g., by accessing a website hosted or otherwise associated with the analytics server). The end-user may then transmit a request to the analytics server to verify data. The request may also include one or more attributes of what needs to be verified, how data needs to be verified, an indication of the data itself, and the like. In one example, the request may include (e.g., data inputted by the end-user using various input elements of the platform) an indication of the data to be verified (e.g., an indication of a data record, such as a social security number, or a file uploaded or identified by the end-user) and an indication of what to be verified (e.g., social security number of the data record matching a user's known social security number, one or more content of the uploaded file matching what the end-user has purported them to be in a form). In some embodiments, the request may also include an urgency value. For instance, the end-user may indicate that the request is time-sensitive and the data needs to be verified urgently. In some embodiments, the urgency value may be predicted or imputed by the analytics server.

At step 220, the analytics server may execute a first computer model to identify a likelihood of verification success of the data. The first computer model may be a model that uses a collection of algorithms including, but not limited to, machine-learning algorithms to determine whether the data to be verified should be transmitted to a service provider. Accordingly, the first computer model may analyze the data to be verified and determine a likelihood of success of the data being verified by one or more service providers.

The first computer model may first review data associated with the request and the data, itself, to be verified to ensure that the data matches the formatting requirement to be verified by a service provider. For instance, the first computer model may determine whether the data has the correct formatting requirement (e.g., format that matches the request). In a non-limiting example, if the request is to verify an electronic document, the first computer model may determine whether the data uploaded (e.g., to be verified) is in a format that is consistent with an electronic document. In another example, the first computer model may determine whether the data has the correct length, matches the correct ID number of the request (e.g., document and request may be assigned an ID number based on an attribute of the request, such as a country of origin), was uploaded properly by the end-user, and the like.

In some embodiments, the first computer model may execute one or more analytical protocols to analyze the data itself. For instance, the first computer model may execute an optical character recognition (OCR) protocol or other protocols (artificial intelligence protocols that visually inspect a document) to determine if the data matches a verification type requested by the end-user. For instance, an OCR protocol may identify data that indicates that an uploaded document is a bank statement. As a result, the analytics server may determine that the uploaded document is an appropriate document for a proof of income verification. However, in another example, if the OCR protocol may reveal that the uploaded document is a marketing brochure (when the request is to verify a merchant's proof of income), the first computer model may determine that the data to be verified has a low likelihood of verification success. As a result, the analytics server may output a notification for the end-user indicating a potential mismatch of data to be verified.

The first computer model may also perform internal fraud check protocols to determine (at least initially) whether the data included fraudulent elements (e.g., whether a document is forged). For instance, the first model may execute one or more data extraction protocols, such as OCR protocols, to identify the content of the data to be verified. Using the extracted data, the first computer model may determine that the data to be verified might be fraudulent or might include fraudulent elements. For instance, if the first computer model identifies font inconsistencies in a document, the first computer model may flag the document as potentially fraudulent, which would in turn receive a low likelihood of verification success.

The first computer model may also analyze data associated with the request and/or the end-user to determine the likelihood of verification success as well. For instance, an IP address associated with a request may be analyzed to see if the IP address indicates potential fraud (e.g., IP address of the request does not correspond to the end-user's usual location or IP address). In another example, the first computer model may analyze the end-user's verification history. If the end-user has previously submitted data that was rejected by a service provider (e.g., indicated as fraudulent, unverifiable, and/or incorrect), the first computer model may assign a lower likelihood of verification success to the request.

In a non-limiting example, the end-user is a merchant who has submitted multiple documents to be verified in the past. Though the documents were not fraudulent, the service providers were unable to verify the content due to formatting issues associated with the documents. As a result, the analytics server received rejection notifications from the assigned service provider and transmitted the document to a manual reviewer where the documents were successfully verified. If the same merchant submits another document, the first computer model may determine whether the format of the new document matches a format of the previously uploaded documents. If so, the first computer model may assign a low success likelihood to the newly uploaded document. Accordingly, because of the low likelihood, the request may be transmitted to a manual reviewer, thereby bypassing unnecessary transmission of the request to a service provider.

The analytics server may keep a list of fraudulent activity and their corresponding accounts/end-users. For instance, the analytics server may generate an identity graph corresponding to fraudulent activities and their associated data points. The identity graph may indicate a cluster of data points that have been associated with a user and/or associated with a previously known fraud cases or otherwise associated with a low likelihood of verification success. Using the identity graph, the first computer model may impute whether a request is possibly fraudulent and/or not likely to be successful.

In a non-limiting example, the first computer model may review data associated with a newly-received request to verify the data and may check its data points against the identity graph. If needed, various data points associated with the request (e.g., associated with the end-user or the document) may be enriched using third-party sources. For instance, the end-user's identification information can be retrieved from one or more third-party databases (e.g., tax ID database or other identification). If any of the data points are a mismatch, the analytics server may determine that fraudulent activity is possible. For instance, if an ID of the end-user in a request does not match a previously verified ID of the same end-user, the first computer model may assign a low likelihood of success to the request. In another example, if the end-user has data (e.g., merchant or business ID number) that is associated with a previous fraudulent document, the first computer model may assign a low likelihood of success to the request. In another example, if the request includes multiple attributes that are similar to a cluster of known fraudulent cases (from other end-users), the first computer model may assign a low likelihood of success to the request.

In some embodiments, the analytics server may extract and analyze metadata to be verified in order to identify the likelihood of success. For instance, an uploaded document purporting to be a bank statement from Bank A may include metadata indicating that it was created by Bank B. Though probably not fraudulent, the document may receive a low likelihood of success. In another example, metadata associated with a document may indicate that the document was created at a time that is inconsistent with that which the document is purporting to illustrate.

In some embodiments, the analytics server may identify the likelihood of verification failure in accordance with historical verification data associated with the service providers. For instance, the analytics server may determine that, historically, service providers have been unable to successfully verify proof of income statements from Bank A due to formatting issues.

In some embodiments, the first computer model may calculate the likelihood of success based on one or more attributes of the end-user. For instance, the first computer model may determine (based on historical data) that merchants with a particular attribute have been historically more successful when their documents have been verified by a service provider with certain attributes.

At step 230 the analytics server may, responsive to the likelihood of verification success satisfying a threshold, execute a second computer model to determine a service provider from the set of service providers (based on a first attribute associated with the data, a type of verification associated with the request, a second attribute associated with the set of service providers, and an impact value associated with each service provider) to transmit the request.

The analytics server may first analyze the likelihood of verification generated by the first computer model. If the determined likelihood of success is lower or higher than a predetermined threshold, the analytics server may determine to transmit the data to one or more service providers (after a second computer model is executed). If the determined likelihood is not lower or higher than the predetermined threshold, the data to be verified may be transmitted to a computing device of an employee where the data can be manually verified or otherwise verified using methods other than utilizing service providers.

The threshold may correspond to a likelihood of success that the analytics server should rely upon before transmitting the data to one or more service providers. The threshold may be expressed as a percentage or as a number within a scale, such as 0.0-1.0 or 0-100. The threshold may be determined and/or revised by a system administrator. The higher the threshold, the fewer data/requests may be sent to service providers. For instance, if the threshold is set to 80%, the analytics server may only transmit data to one or more service providers if the data is more than 80% likely to be successfully verified by at least one service provider.

In some embodiments, the analytics server may also stop the transmission of data to be verified by one or more electronic verification systems if the data has a very high likelihood of success. For instance, the threshold may be a two-prong threshold where only data that has a likelihood of successful verification of less than 95% but more than 60% will be transmitted to one or more service providers. Accordingly, data that has a very high likelihood of success may also not be transmitted to a service provider because the data can be verified using a manual reviewer, which will have less impact (lower computational cost) on the analytics server.

If the data to be verified satisfies the threshold, the analytics server may then determine a suitable service provider to verify the data. The suitable service provider may be selected based on one or more attributes of the data to be verified or the end-user submitting the request, or based on one or more attributes of each service provider or an impact value associated with each service provider verifying the electronic request.

In some embodiments, the analytics server may execute a second computer model to identify a score associated with each service provider within a set of available service providers. The analytics server may then identify a suitable service provider based on its respective score. The second computer model may be a machine-learning model that has been trained using a training dataset comprising previous data processed by one or more service providers. The training dataset may include an outcome of the verification by the selected service provider (e.g., succeeded or failed). Additionally, the training dataset may include attributes associated with each service provider (e.g. numerical representations of strengths and weaknesses in performance of each service provider). In another example, each service provider may have an impact value. An impact value, as used herein, may refer to a cost or an impact associated with each service provider. For instance, each service provider may require a monetary fee to verify the data. In another example, the impact value may indicate a verification duration or latency value associated with each service provider (e.g., a service provider having less latency and a shorter verification time is more desirable than other service providers).

The analytics server may train the second computer model using various machine-learning algorithms (e.g., supervised, semi-supervised, or unsupervised). After the second computer is trained, the second computer model may be configured to receive data to be verified and/or data associated with a request (e.g., data associated with the end-user) and generate a score for each service provider.

Additionally or alternatively, the second computer model may initially review the type of data to be verified, the type of verification needed, and/or any user preferences or restrictions to select or eliminate one or more service providers. Certain service providers may be prevented from verifying certain verification types. For example, certain sensitive data may be required (legally or via an indication of the end-user and/or the service provider, itself) to be verified by service providers that satisfy certain criteria. In a non-limiting example, tax data may be required to be verified by a service provider that is pre-approved by the analytics server. In another example, certain service providers may be restricted from reviewing social security information. As a result, they may be excluded when the data to be verified is a merchant's tax ID or an end-user's social security number. In another example, credit worthiness information may be restricted from being verified by service providers having servers located outside the United States.

In some embodiments, the end-user may indicate (e.g., in a user profile) an affinity towards a particular service provider. Additionally, the second computer model may eliminate certain service providers based on whether they have an active status. For instance, certain service providers may have time or data type restrictions that must be implemented.

The second computer model may use a waterfall approach to evaluate each service provider and generate a score for each service provider. The score for each service provider may correspond to an impact value associated with each service provider (e.g., the cost associated with each service provider), a latency value associated with each service provider (e.g., the latency value at the time of evaluation or a historical latency value), verification time frame associated with each service provider, general success rate (historical or a recent success rate), and the like.

The score may also depend on one or more attributes of the data to be verified, such as a data type. Using the training dataset, the second computer model may identify a relationship between each service provider's success rate and a verification type or data type of the request. Certain service providers may have higher success rate for verifying loan documents than other service providers while some other service provider may be more efficient and have higher success rate for verifying documents used for proof of income or creditworthiness. The second computer model may analyze historical verification data associated with different request types and determine verification patterns associated with different service providers.

Attributes considered by the second computer model may be derived from historical data or may be derived from recent time frames. In some embodiments, the determination of whether to use historical or more recent data points to evaluate a service provider may depend on the type of attributes being evaluated. For instance, regarding latency, the second computer model may use the most recent value, allowing the second computer model to adapt (in real-time or near real-time) if a service provider is having technical issues (affecting their performance) or has a sudden and unexpected latency that deviates from a historical latency trend. In another example, the second computer model may consider a rolling time frame (e.g., the last month) when evaluating for success rate. Therefore, a spike or sudden drop of the success rate may be ignored by the second computer model, while a spike or sudden drop in latency may be highlighted by the second computer model.

In calculating the score, the second computer model may also consider the attributes of a merchant. The second computer model may have been trained using historical data where one or more attributes of an end-user (e.g. size of the company, type of verification, and the like) may be considered when selecting a suitable service provider. For instance, documents received from larger companies may be historically easier to verify because larger companies typically have an accounting department that uses uniform templates to generate documents. As a result, when a document is generated by an accounting department of a large company, the second computer model may calculate the score accordingly.

Using their respective scores generated by the second computer model, the analytics server may identify a suitable service provider.

At step 240, responsive to determining the service provider from the set of service providers, the analytics server may transmit via an API the data to the service provider.

The analytics server may use the API to transmit the data to be verified to one or more service providers identified in the step 230. The analytics server may transmit the data to be verified (e.g., file uploaded by the end-user) to the selected service provider. In some embodiments, the analytics server may also transmit data associated with the request and/or the end-user to the service provider. For instance, the analytics server may transmit metadata collected in association with the request (e.g., creation timestamp of the document to be verified) and/or user data (e.g., demographics, user profile information, historical verification data).

When identifying a suitable service provider, the second computer model may also consider previous requests transmitted to service providers. For instance, a certain service provider may have a high score for verifying proof of income documents. However, it may not be efficient to send all existing proof of income verification requests to the same service provider. To eliminate this bias, the analytics server may implement a solution as described below.

First, the second computer model may not evaluate scores for different verification requests in isolation. That is, the scores calculated for different requests may be calculated in batches or in a queue where other requests are also considered.

Second, the analytics server may transmit requests to the service provider having the highest score of one or more relevant attributes until the one or more attributes of that service providers changes, such that their underlying score is affected. For instance, the analytics server may access a queue of verification requests and transmit a first request to a service provider with the highest score. For the next iteration (next request), the analytics server may execute the second model again and transmit a second request to the same service provider because the same service provider may still have the highest score. The analytics server may repeat this process until an attribute of the service provider (e.g. latency) lowers the service provider's score, such that it no longer has the highest score. At that point, the analytics server may transmit the request to a new service provider, which now has the highest score. In this way, the analytics server may continue transmitting requests to service providers with highest scores of the relevant attribute.

In some embodiments, a request may be bifurcated and transmitted to multiple service providers. For instance, an end-user may request verification of multiple attributes for the same document. In those embodiments, the analytics server may execute the first and second models with respect to each request separately and generate two independent scores that depend on each verification type. The analytics server may then transmit the requests in accordance with their individual scores. In a non-limiting example, a merchant may upload a document and request the proof of income and tax ID to be verified. The analytics server may determine that a first service provider should verify the income within the document and a second service provider should verify the tax ID.

In some embodiments, at least a part of the verification may be performed by the analytics before sending the data to the identified service provider. For instance, the analytics server may OCR an electronic document and extract various attributes of a document to be verified.

Figure 3:
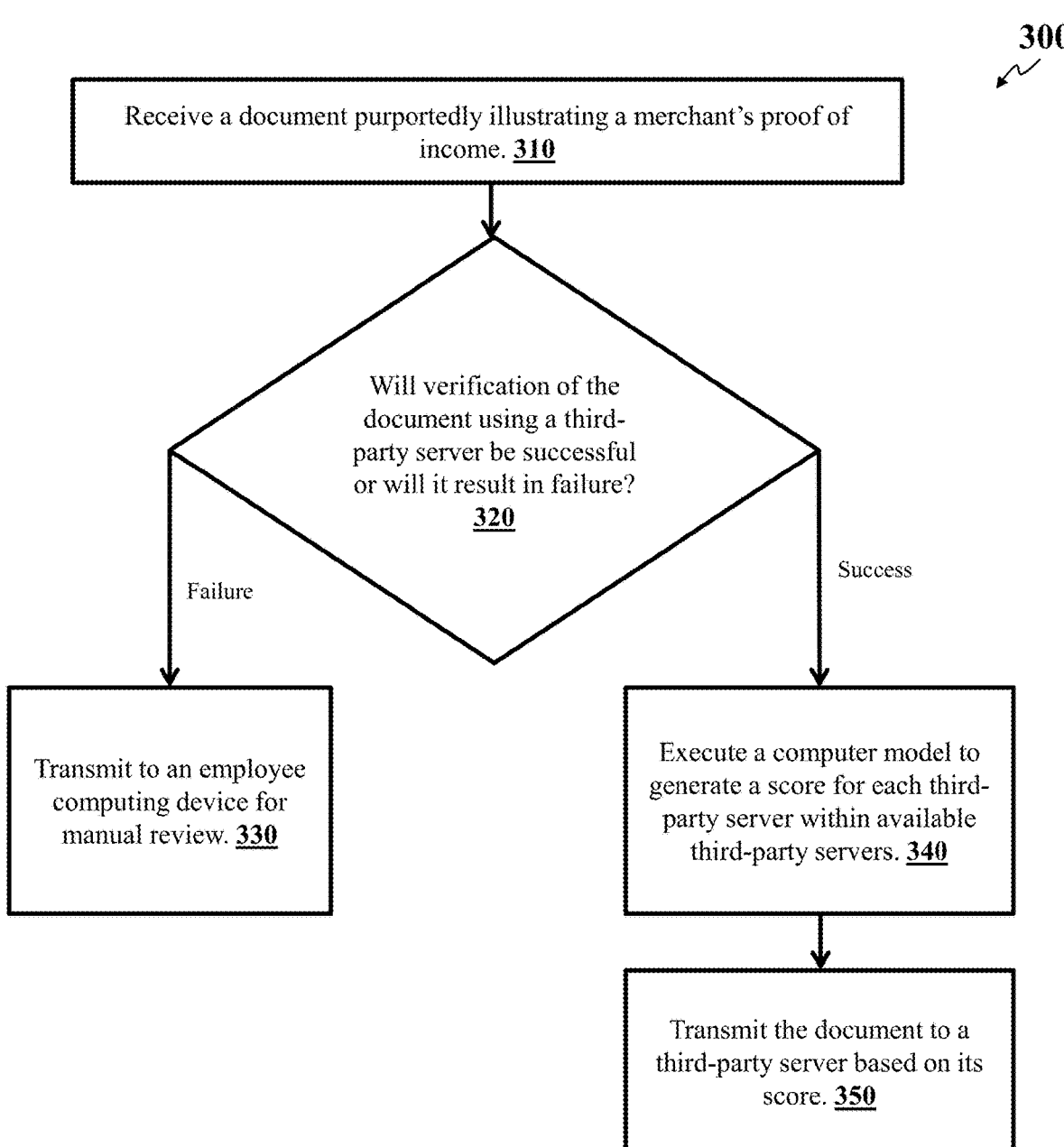
FIG. 3 illustrates a flow diagram of a process executed in an intelligent data verification platform, according to an embodiment.

Referring now to FIG. 3, a method 300 illustrates a flow diagram of a process executed in an intelligent data verification platform, according to an embodiment. The method 300 is a non-limiting example of execution and implementation of the methods and systems discussed herein, including the method 200.

At step 300, the analytics sever may receive a document purportedly illustrating a merchant's proof of income. In this example, an end-user may access the platform and upload a document (e.g., a pdf file). The end-user may indicate that the end-user is interested in verifying that the merchant's income value is $75,000.

At step 320, the analytics server may execute a computer model (e.g., the first computer model) and determine whether verification of the document using a third-party server would be successful or result in failure. The computer model may determine a likelihood or probability of the verification's success (or failure, depending on model settings) using a third-party service provider. As discussed herein, the model may determine a numeric score of the likelihood. The analytics server may then determine whether the verification is successful or results in a failure, based on the numerical score relative to a threshold. The threshold may be set by a system administrator and may be adjusted to revise the platform's accuracy.

If the analytics server determines that verifying the document using a third-party service providers will likely result in a failure, the analytics server may transmit the document to an employee computing device for manual review (step 330). If, however, the analytics server determines that the verification will likely be successful, the analytics server may execute a second computer model (e.g., the machine-learning model discussed in step 230) to generate a score for each third-party server within available third-party servers (step 340). Using the methods and systems discussed herein, the machine-learning model may generate scores for different third-party service providers.

Based on the scores generated by the machine-learning model, the analytics server may select a suitable service provider. For instance, the analytics server may select the service provider with the highest score. Consequently, the analytics server may transmit the document to a third-party server based on its score (step 350). The third-party service provider may then verify the document and determine whether the document indicates the merchant's income as $75,000. The analytics server may then receive an indication of the verification from the third-party service provider and output the results (e.g., display the results on the intelligent data verification platform). The analytics server may also transmit a notification of positive verification to a downstream software application.

FIG. 4 illustrates a flow diagram of a process executed in an intelligent data verification system, according to an embodiment. The method 400 includes steps 410-420. However, other embodiments may include additional or alternative execution steps, or may omit one or more steps altogether. The method 400 is described as being executed by a server, similar to the analytics server described in FIG. 1. However, one or more steps of method 400 may also be executed by any number of computing devices operating in the distributed computing system described in FIG. 1. For instance, one or more computing devices (e.g., end-user devices) may locally perform part or all the steps described in FIG. 4.

In some embodiments, the same server or processor (or servers/processors belonging to the same organization) may execute the platform and train the models discussed herein. For instance, the analytics server may execute the method 200 to implement the platform and train a model using the method 400. Alternatively, the analytics server may generate the training dataset and may outsource the training to a different server (e.g., third-party server).

At step 410, the analytics server may generating, by a processor, a training dataset by monitoring training data associated with a request routing processor configured to receive a request to verify data and to transmit the data to at least one service provider from a set of service providers, the training dataset comprising a set of requests received by the request routing processor, each request comprising data to be verified; a likelihood of verification success for each request within the training dataset, the likelihood of verification generated based on the request routing processor executing a first computer model; a score generated based on the request routing processor executing a second computer model that is configured to use a first attribute associated with the data to be verified, a type of verification associated with each request, a second attribute associated with each service provider, and an impact value associated with each service provider to generate the score; and a routing selection, by the request routing processor, to at least one service provider to perform the verification based on the score and the likelihood of verification success.

The analytics server may monitor data associated with the platform discussed herein. Specifically, the analytics server may record data generated as a result of the analytics server using various methods (e.g., the method 200) to identify a suitable service provider and transmit verification requests to the identified service provider. In some embodiments, the analytics server may monitor and record data generated while the platform is in operation in order to analyze requests and transmit the request to different service providers. For instance, the analytics server may record data generated as a result of implementing the method 200. The recorded data may then be used to generate a training dataset where the analytics server can use the training dataset to train one or more models (e.g., machine-learning models).

The analytics server may monitor and record historical requests to verify data. The analytics server may monitor and record data associated with the execution of a first computer model to generate a likelihood of verification success (e.g., step 220 in FIG. 2). The analytics server may monitor and collect data associated with execution of a second computer model that is configured to determine a suitable service provider. For instance, the analytics server may monitor and record how the second computer model generates a score for each received request (e.g., step 230 in FIG. 2). The analytics server may also monitor and record data associated with routing selection of each request to at least one service provider to perform the verification based on their respective score and/or the likelihood of verification success.

The analytics server may aggregate the data monitored and collected in order to generate a training dataset. In some embodiments, the analytics server may perform various clean-up protocols to achieve better model training, such as refining the aggregated data to improve training quality. For instance, the analytics server may de-duplicate various data points, change various frequencies to achieve more uniform data distribution, and/or aggregate or eliminate outliers or data records.

At step 420, the analytics server may train a third computer model using the training dataset, wherein the trained third computer model is configured to receive a new request for verify new data and predict at least one service providers of a set of service providers for routing the request.

The analytics server may use the training dataset generated in the step 410 to train the machine-learning model using various methods, such as a supervised, unsupervised, and/or semi-supervised. In some embodiments, using a supervised method, the analytics server may label the training dataset where the ultimate outcome (e.g., identification of the service provider) is labeled as the ground truth. Using the labeled training dataset, the analytics server may train itself and identify hidden patterns within the data and connect how the data records within the training dataset can be used to predict the ultimate outcome.

The method 400 discusses an embodiment in which the third computer model is a machine-learning model. However, other embodiments may include other types of computer models. The analytics server may train the machine-learning model in conjunction with executing or implementing the platform. For instance, during training, the analytics server may iteratively produce new predicted results for requests. The analytics server may then use the method 200 to transmit the requests to one or more service providers. The analytics server may then compare the results predicted by the machine-learning model with the results identified using the method 200. If the characteristics of the predicted results (e.g., selection of a suitable service provider) do not match the results used by the platform, the analytics server continues the training unless and until the machine learning-generated results satisfy one or more accuracy thresholds and are within acceptable ranges.

Additionally or alternatively, the analytics server may use an unsupervised method where the training dataset is not labeled. Because labeling the data within the training dataset may be time-consuming and may require substantial computing power, the analytics server may utilize unsupervised training techniques to train the machine learning model.

After training is completed (during the inference phase), the machine-learning model may be configured to receive a new request to verify data and use its training (via historical requests and how they were previously routed) to predict a suitable service provider. The machine-learning model may be executed in conjunction with or as an alternative option to the platform itself. For instance, when a request is received, the analytics server may proceed with executing a machine-learning model instead of the first and second computer models discussed in the method 200. As a result, the analytics server may identify a suitable service provider.

Additionally, the trained machine-learning model may be configured to predict specific data associated with the request. For instance, the trained machine-learning model may ingest data associated with a request and may predict a likelihood of success for the new request. The trained machine-learning model may also predict a score for the new request. In essence, the trained machine-learning model may predict all characteristics considered or calculated in the method 200.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method of reducing latency in electronic verification systems by dynamically selecting a service provider computer of a set of service provider computers using an artificial intelligence computer model to improve routing efficiency across networked computing environments for sequential request routing techniques, the method comprising:

receiving, by a processor from a computing device, a request to verify data comprising an uploaded document via at least one service provider computer of the set of service provider computers;

executing, by the processor, a character recognition protocol to detect text of the uploaded document;

determining, by the processor, a document type associated with the uploaded document based on the detected text of the uploaded document;

generating, by the processor, a first attribute based on whether the document type matches a type of verification associated with the request to verify data;

executing, by the processor, a first computer model to identify a likelihood of verification success of the data based on the first attribute;

responsive to determining that verifying the data via the set of service provider computers will reduce latency of the request to verify data based on the likelihood of verification success satisfying a first threshold corresponding to a minimum acceptable likelihood of verification success and not satisfying a second threshold corresponding to a maximum acceptable likelihood of verification beyond which routing to at least one service provider would not improve latency:

executing, by the processor, the artificial intelligence computer model to determine a service provider computer from the set of service provider computers to transmit the request based on a respective score associated with each service provider computer, the artificial intelligence computer model being previously trained to identify a score for each service provider using historical verification data and to identify the service provider computer to which to transmit the request, each respective score corresponding to a type of verification associated with the request, the first attribute indicating whether the document type matches the type of verification, a latency value associated with the set of service provider computers, and an impact value associated with each service provider computer, wherein the artificial intelligence computer model is configured to reduce the latency of satisfying the request; and identifying, by the processor, the service provider computer from the set of service provider computers with a respective score corresponding to a reduction in the latency associated with satisfying the request.

2. The method of claim 1, wherein the first computer model determines the likelihood of verification success of the data using at least one of:

an attribute of a user operating the computing device, the first attribute associated with the data, a timestamp associated with the request, historical verification data associated with the user, historical verification data associated with at least one service provider, or the type of verification associated with the request.

3. The method of claim 1, further comprising:

executing, by the processor, an optical character recognition protocol to identify the first attribute.

4. The method of claim 1, wherein the artificial intelligence computer model further uses data associated with a previous request transmitted to one or more service providers.

5. The method of claim 1, wherein the impact value corresponds to a cost associated with verification of the request by each service provider.

6. The method of claim 1, further comprising:

responsive to the latency value of the service provider computer falling below a threshold, executing, by the processor, the artificial intelligence computer model to determine a second service provider computer among the set of service provider computers to transmit the request to; and routing, by the processor via an application programming interface, the data to the second service provider computer.

7. The method of claim 1, wherein at least one of the first threshold or the second threshold is dynamically updated based on a performance metric of at least one service provider computer.

8. A method for training an artificial intelligence computer model to dynamically select a service provider computer of a set of service provider computers for routing in electronic verification systems to improve routing efficiency across networked computing environments for sequential request routing techniques, the method comprising:

generating, by a processor, a training dataset by monitoring training data associated with a request routing processor configured to receive a request to verify data comprising an uploaded document and to transmit the data to at least one service provider from a set of service providers, the training dataset comprising:

a set of requests received by the request routing processor, each request comprising data to be verified;

a first attribute for each request within the training dataset, the first attribute generated based on executing a character recognition protocol to detect text of an uploaded document associated with each request, determining a document type of each uploaded document based on the detected text, and determining whether the document type matches a type of verification associated with each request within the training dataset;

a likelihood of verification success for each request within the training dataset, the likelihood of verification success generated based on the request routing processor executing a first computer model;

a score generated based on the request routing processor executing an artificial intelligence computer model that is configured to use a type of verification associated with each request, the first attribute indicating whether the document type matches the type of verification, a latency value associated with each service provider, and an impact value associated with each service provider to generate the score; and a routing selection, by the request routing processor, to at least one service provider to perform the verification based on the score and the likelihood of verification success satisfying a first threshold corresponding to a minimum acceptable likelihood of verification success and not a second threshold corresponding to a maximum acceptable likelihood of verification beyond which routing to at least one service provider would not improve latency; and training, by the processor, the artificial intelligence computer model using the training dataset, wherein the artificial intelligence computer model is configured to receive a new request to verify new data and determine a service provider computer from the set of service provider computers to transmit the request based on a respective score associated with each service provider computer, the artificial intelligence computer model being previously trained to identify a score for each service provider using historical verification data and to identify the service provider computer with a shortest verification time to which to transmit the request, each respective score corresponding to a type of verification associated with the request, a first attribute indicating whether the document type matches a type of verification, a latency value associated with the set of service provider computers, and an impact value associated with each service provider computer, wherein the artificial intelligence computer model is configured to reduce latency of satisfying the request.

9. The method of claim 8, wherein the processor and the request routing processor belong to a same organization.

10. The method of claim 8, wherein the artificial intelligence computer model is further configured to predict a likelihood of verification success for the new request.

11. The method of claim 8, wherein the artificial intelligence computer model is further configured to predict a score associated with at least one service provider verifying the new data.

12. The method of claim 8, wherein the impact value corresponds to a cost associated with verification of the request by each service provider.

13. The method of claim 8, wherein at least one of the first threshold or the second threshold is dynamically updated based on a performance metric of at least one service provider computer.

14. A system for using an artificial intelligence computer model to improve routing efficiency of data verification requests among a set of service provider computers by reducing latency of data verification, the system comprising:

a non-transitory computer-readable medium having a set of instructions that when executed by a processor, cause the processor to:

receive, from a computing device, a request to verify data comprising an uploaded document via at least one service provider computer of the set of service provider computers;

execute a character recognition protocol to detect text of the uploaded document;

determine a document type associated with the uploaded document based on the detected text of the uploaded document;

generate a first attribute based on whether the document type matches a type of verification associated with the request to verify data;

execute, a first computer model to identify a likelihood of verification success of the data;

responsive to the likelihood of verification success satisfying a first threshold corresponding to a minimum acceptable likelihood of verification success and not satisfying a second threshold corresponding to a maximum acceptable likelihood of verification beyond which routing to at least one service provider would not improve latency:

execute the artificial intelligence computer model to determine a service provider computer from the set of service provider computers to transmit the request based on a respective score associated with each service provider computer, the artificial intelligence computer model being previously trained to identify a score for each service provider using historical verification data and to identify the service provider computer to which to transmit the request, each respective score corresponding to a type of verification associated with the request, the first attribute indicating whether the document type matches a type of verification, a latency value associated with the set of service provider computers, and an impact value associated with each service provider computer, wherein the artificial intelligence computer model is configured to reduce the latency of satisfying the request; and determine the service provider computer from the set of service provider computers with a respective score corresponding to a reduction in the latency associated with satisfying the request.

15. The system of claim 14, wherein the first computer model determines the likelihood of verification success of the data using at least one of:

an attribute of a user operating the computing device, the first attribute associated with the data, a timestamp associated with the request, historical verification data associated with the user, historical verification data associated with at least one service provider, or the type of verification associated with the request.

16. The system of claim 14, wherein the set of instructions further cause the processor to:

execute an optical character recognition protocol to identify the first attribute.

17. The system of claim 14, wherein the artificial intelligence computer model further uses data associated with a previous request transmitted to one or more service providers.

18. The system of claim 14, wherein the impact value corresponds to a cost associated with verification of the request by each service provider.

19. The system of claim 14, wherein at least one of the first threshold or the second threshold is dynamically updated based on a performance metric of at least one service provider computer.

\* \* \* \* \*